United States Patent Office 3,419,558
Patented Dec. 31, 1968

3,419,558
METHOD OF MAKING 5-ANILINO URACILS
Agostino V. Perrotta, Bronx, N.Y., assignor to Burroughs Wellcome & Co. (U.S.A.) Inc., Tuckahoe, N.Y., a corporation of New York
No Drawing. Filed Nov. 8, 1965, Ser. No. 506,883
Claims priority, application Great Britain, Nov. 19, 1964, 47,131/64
2 Claims. (Cl. 260—256.4)

ABSTRACT OF THE DISCLOSURE

This invention is directed to a method of preparing compounds of the formula

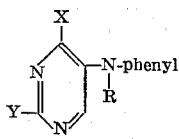

which comprises the reaction between 5-aminouracil or a 5-N-alkylaminouracil with the appropriate aniline or N-R-aniline in the presence of mineral acid. The compounds produced by this invention are useful as intermediates and may be converted to compounds which act as antimalarials and as bactericides.

---

This invention relates to the preparation of pyrimidines, and in particular to the preparation of 2,4-dihydroxy-5-anilinopyrimidines (5 - anilinouracils) and derivatives thereof.

In British patent specification No. 971,307 there is disclosed the preparation of 5-anilinouracils from 5-bromouracil and the appropriate anilines. The reaction is carried out by refluxing the reactants in a high-boiling hydroxylic solvent such as ethylene glycol. This method is not entirely satisfactory since the yields of the 5-anilinouracils are frequently low.

It has now been found that a 5-anilinouracil of Formula I may be obtained in good or excellent yield by heating a 5-aminouracil or a 5-N-alkylaminouracil with an aniline or an N-R-aniline in the presence of about one equivalent of a mineral acid.

In Formula I

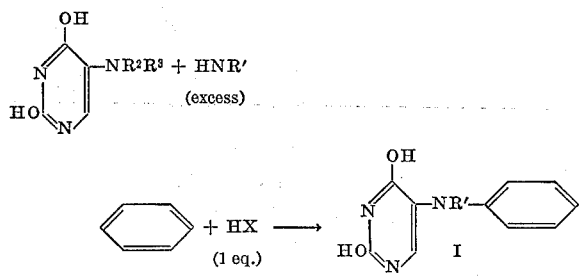

wherein R', R² and R³ are members of the class consisting of lower alkyl and hydrogen and NR²R³ may also be a cyclic group such as piperidino, pyrrolidino or morpholino, and the phenyl group may bear one or more substituents, for example halogen atom, alkyl, nitro and alkoxy groups. When it is desired to obtain an N-alkylanilinouracil of Formula I, the appropriate N-alkylaniline reactant should be chosen. When a 5-N-alkylaminouracil is used as a reactant, the alkyl group is removed in the course of the reaction and the end product does not bear the said alkyl group.

In preparing a 5-anilinouracil of Formula I, it is convenient to use considerable excess of the aniline as a solvent, preferably at least two equivalents. The mineral acid may be introduced into the reaction mixture either as the free acid or combined with one of the amine reactants. For example 5-aminouracil hydrochloride may be added to the appropriate aniline, or 5-aminouracil together with one equivalent of aniline hydrochloride may be mixed with the remainder of the aniline in the form of the base. Other strong acids such as sulphuric acid, hydrobromic acid or phosphoric acid may be used in place of hydrochloric acid.

The reaction is preferably carried out at a temperature of about 200° C. When the reactants are aniline or a toluidine, this temperature may be attained by refluxing the reaction mixture. When other higher boiling amines are used, the reaction mixture is heated in an oil bath or a metal bath at about 200 to 220° C. When the aniline is a solid it is heated to its melting point if it is above 200° C.

These 5-anilinouracils can be converted into derivatives, for example by chlorination, amination of chloro compounds with ammonia, or by thiation. Thus, 2,4-dihydroxy-5-anlinopyrimidine (5-anilinouracil) is converted into 2,4-dichloro-5-anilinopyrimidine by reaction with phosphoryl chloride, and this is converted into 2,4-diamino-5-anilinopyrimidine by heating with alcoholic ammonia. These transformations are fully described in British patent specification No. 971,307.

This invention therefore provides a method for the preparation of a 5-anilinouracil of the formula

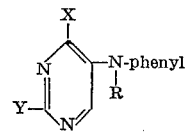

wherein X and Y are each a hydroxy group, R is a hydrogen atom or a lower alkyl group preferably containing 1 to 5 carbon atoms and the phenyl group may bear substituents, for example halogen atoms, alkyl, nitro and alkoxy groups, which comprises the reaction between a 5-aminouracil or a 5-N-alkylaminouracil with the appropriate aniline or N-R-aniline in the presence of a mineral acid, and the further optional step of transforming by chlorination, amination or thiation a product prepared as above into a derivative thereof wherein each of X and Y is an amino group, a chlorine atom or a mercapto group.

The 2,4-diamino derivatives of the compounds of Formula I, for which the compounds of Formula I are intermediates are useful as antimalarial drugs and as bactericides. The 2,4-dihydroxy compounds (for example the 5-anilinouracil and 5-m-toluidinouracil derivatives) have the ability to suppress immune response in experimental animals, and are therefore of potential value in connection with surgical transplantation.

The following examples illustrate the invention. Temperatures are in degrees Celsius. Generally, the 5-anilinouracils melt at rather high temperatures, probably with decomposition. As a result principal reliance for characterisation is placed on the ultra-violet absorption spectra rather than on the melting point.

Example 1.—5-anilinouracil

Aniline (10 ml.) and 5-aminouracil hydrochloride (1.5 g., 8 mmoles) were heated under refluxed for 4½ hours. The reaction mixture was cooled and poured into water. The aqueous solution was washed with ether and placed in a refrigerator overnight. The precipitated solid was collected, washed with acetone and slurried with concentrated hydrochloric acid for 15 minutes. It was again filtered, washed with water and acetone and dried. The product weighed 1.5 g.

Example 2.—5-anilinouracil

This reaction was carried out in the manner of Example 1 except that 5-N-n-butylaminouracil hydrochloride was employed in place of 5-aminouracil hydrochloride. The material was identical with that obtained from Example 1.

Example 3.—5-anilinouracil from 5-piperidino uracil

Two g. (0.01 mole) of 5-piperidino uracil, 2.6 g. (0.02 mole) of aniline hydrochloride and 3 ml. of aniline were heated to reflux for 4.5 hours. Solid was present throughout this period. After standing over-night the reaction mixture was diluted with water and acetone and filtered. The precipitate was washed successively with water and acetone.

The product which was not quite colorless weighed 2 grams crude. It was recrystallized from Methyl Cellosolve and was then analytically pure.

Using the same procedure 5-amino uracil was reacted with p-bromoaniline and with O-nitroaniline 5-p-bromoanilino uracil was obtained in 81% yield and 5 o-nitroanilinouracil in 31% yield.

In Table 1 below are shown the results of the preparation of further compounds of Formula I by the method of the invention in the manner described in Example 1. Also shown in the Table are the yields obtained, and the physical properties of the products including those of the product of Examples 1 and 2.

and nitro, which comprises heating at a temperature of around 200° C. a compound of the formula

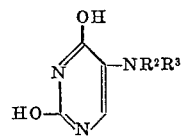

wherein $R^2$ and $R^3$ are members selected from the class consisting of hydrogen and lower alkyl, and $NR^2R^3$ may also be piperidino, pyrrolidino or morpholino with an excess of an aniline

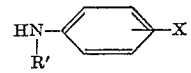

with at least one equivalent of a strong mineral acid.

2. The method of preparing 5-anilino uracils, which comprises heating at a temperature of about 200° C. a 5-amino uracil of the formula

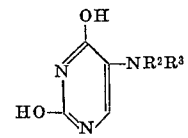

with an excess of an aniline HNR' phenyl and at least about one equivalent of a strong mineral acid, wherein R', $R^2$ and $R^3$ are members from the class consisting of hydrogen and lower alkyl, and $NR^2R^3$ may also be piperidino, pyrrolidino or morpholino.

| Compound of Formula I | Percent yield | Percent yield by method of U.K. 971,307 | M.P., °C. | pH | λ max. | max. ε .10⁻³ | λ min. | min. ε .10⁻³ |
|---|---|---|---|---|---|---|---|---|
| 5-p-nitroanilinouracil | 80 | | [1] 324 | 1 | 382 | 17.3 | 287 | 3.3 |
| | | | | 13 | 288 | 6.6 | 272 | 6.0 |
| | | | | | 398 | 17.9 | 320 | 4.0 |
| 5-p-anisidinouracil | 92 | 83–91 | [1] 305–310 | 1 | 249 | 11.2 | 226 | 8.4 |
| | | | | | 312 (SL) | 3.5 | | |
| | | | | 13 | 234 | 12.4 | | |
| | | | | | 297 (SL) | 5.3 | | |
| 5-p-chloranilinouracil | 73 | 46–68 | [1] 300 | 1 | 248 | 9.95 | 227 | 6.3 |
| | | | | 13 | 242 | 12.1 | | |
| | | | | | 295 (SL) | 4.8 | | |
| 5-N-sec. amylanilinouracil | 70 | 46 | [1] 303–307 | 1 | 277 | 8.0 | 253 | 7.2 |
| | | | | 13 | 234 | 12.3 | | |
| | | | | | 290 (SL) | 6.0 | | |
| 5-anilinouracil | 93 | 70–85 | [1] >300 | 1 | 240 | 11.6 | 222 | 9.5 |
| | | | | 13 | 235 | 11.6 | | |
| | | | | | 287 (SL) | 6.2 | | |
| 5-m-chloroanilinouracil | 92 | 25–30 | [1] 307 | 1 | 244 | 12.4 | 230 | 10.9 |
| | | | | 13 | 245 | 10.8 | 231 | 9.6 |
| | | | | | 288 | 6.5 | 273 | 5.9 |
| 5-N-methylanilinouracil | 69 | 24–45 | 264–265 | 1 | 245 | 17.1 | 222 | 12.2 |
| | | | | | 325 (SL) | 1.9 | | |
| | | | | 13 | 251 | 14.6 | 228 | 9.3 |
| | | | | | 285 | 8.0 | 280 | 7.8 |
| 5-o-chloroanilinouracil | 55 | 7–12 | [1] 309–312 | 1 | 240 | 13.0 | 227 | 11.1 |
| | | | | 13 | 239 | 12.2 | 230 | 11.2 |
| | | | | | 289 | 7.5 | 271 | 6.3 |
| 5-o-toluidinouracil | 94 | 42–59 | [1] 295–297 | 1 | 240 | 13.0 | 227 | 11.1 |
| | | | | 13 | 239 | 12.2 | 230 | 11.2 |
| | | | | | 289 | 7.5 | 271 | 6.3 |

[1] Decomposition.

What I claim is:

1. The method of preparing a compound of the formula

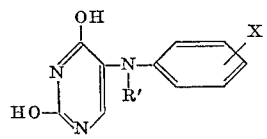

wherein R' is selected from the class consisting of hydrogen and lower alkyl and X is selected from the class consisting of lower alkyl, lower alkoxy, halogen, hydrogen References Cited

FOREIGN PATENTS 971,307    9/1964    Great Britain.

OTHER REFERENCES

Krumbiegel et al.: Z. Physik. Chem. (Leipzig), vol. 227 (3/4), 1964, pp. 179–86.

NICHOLAS S. RIZZO, Primary Examiner.

R. J. GALLAGHER, Assistant Examiner.

U.S. Cl. X.R.

167—33; 65, 78